Oct. 27, 1931.  C. C. BRINTON  1,828,921
TUFT CUTTING MECHANISM OF AXMINSTER CARPET
AND OTHER TUFTED FABRIC LOOMS
Filed Sept. 13, 1929   2 Sheets-Sheet 2
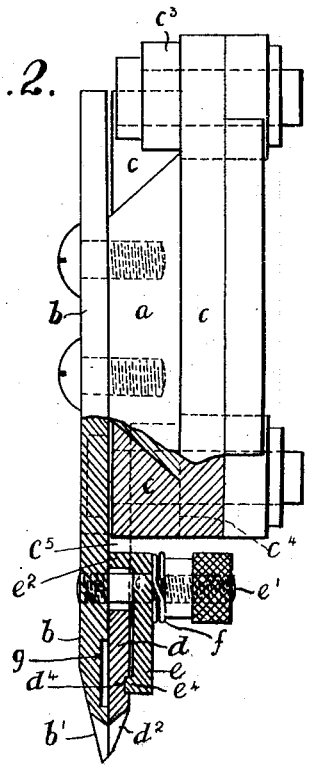
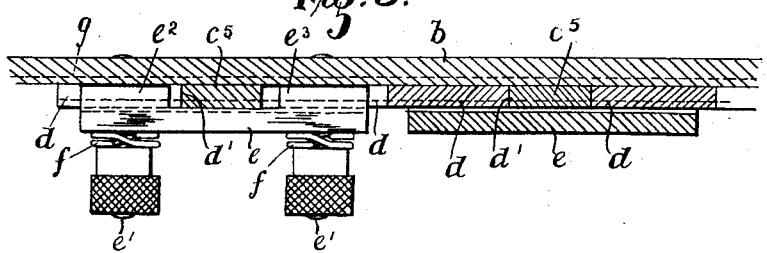
INVENTOR:
C. C. Brinton
BY
ATTORNEYS.

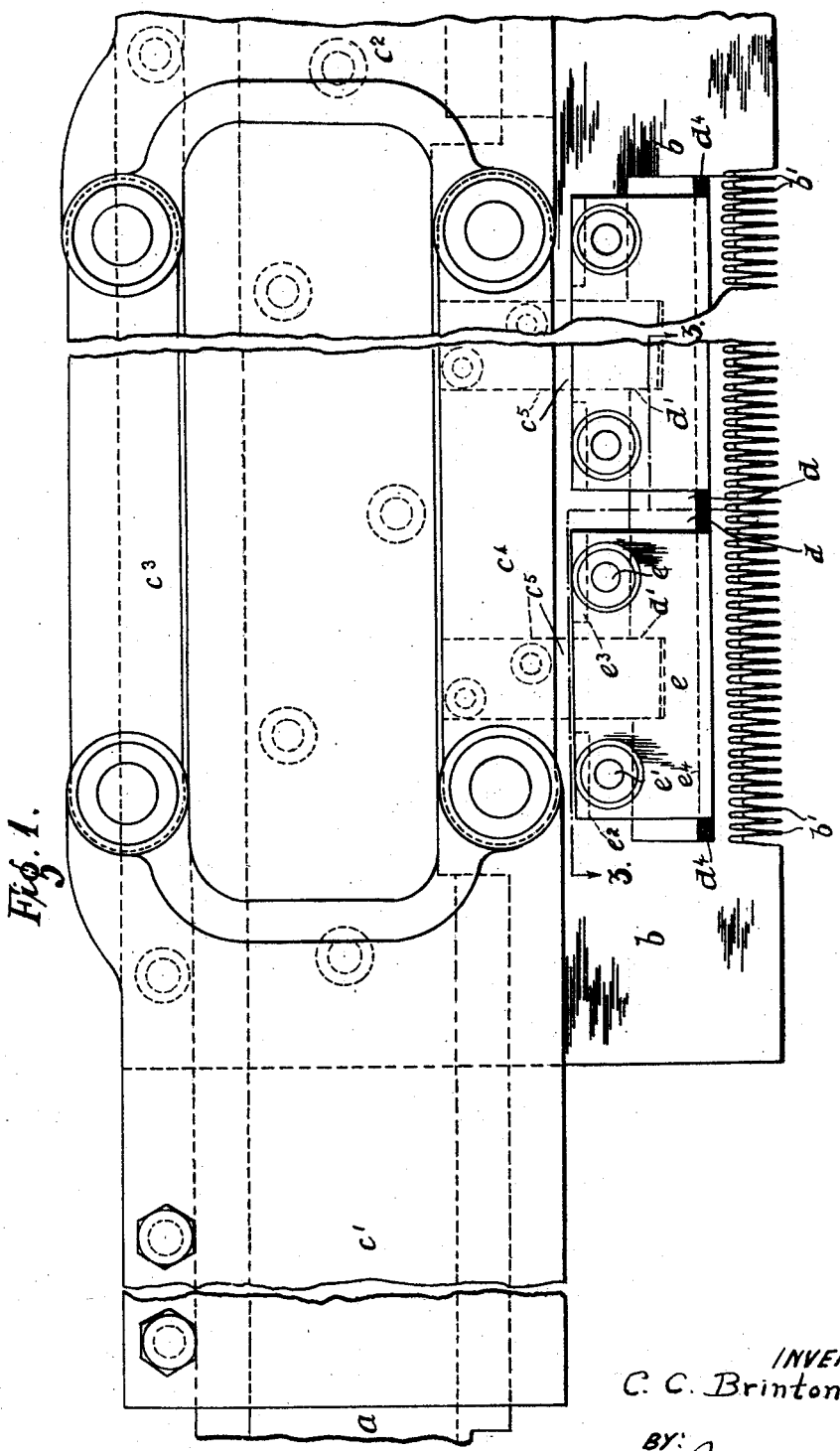

Patented Oct. 27, 1931

1,828,921

UNITED STATES PATENT OFFICE

CECIL CHARLES BRINTON, OF KIDDERMINSTER, ENGLAND, ASSIGNOR OF ONE-HALF TO BRINTONS' LIMITED, OF KIDDERMINSTER, ENGLAND, A BRITISH COMPANY

TUFT-CUTTING MECHANISM OF AXMINSTER CARPET AND OTHER TUFTED-FABRIC LOOMS

Application filed September 13, 1929, Serial No. 392,432, and in Great Britain September 14, 1928.

The tuft-cutting mechanism embodied in certain type of looms for weaving tufted fabrics, such as the Brinton Axminster-carpet loom, usually involves the use of one or more long-stroke cutting-knives which, during each cycle of the loom, are traversed along the face of a stationary knife-comb and each operate successively to cut off a number of tufts from the yarns that previously have been seized from the yarn-carriers, and drawn between the teeth of the said knife-comb, by the tuft-grippers. These traversing cutter-blades have, in some cases, a working stroke as long as three feet and not only do their cutting and return strokes occupy a considerable proportion of each loom-cycle and correspondingly slow down the working of the loom, but their actuation involves the use of complicated and bulky mechanism and demands the expenditure of considerable power. The long blades are, moreover, subject to heavy wear and stresses and the adjustments necessary for maintaining them in effective cutting relationship to the stationary knife-comb are difficult of performance.

According to the present invention, which obviates the disadvantages attending the use of long-stroke cutters, and realizes an appreciable speeding up of the working of the loom, or reduction of the time factor of the cycle, it is proposed to embody in a Brinton-type or similar loom, a tuft-cutting mechanism that comprises, in combination with a stationary knife-comb, a moving cutting-comb (preferably made up of a series or gang of separate and independently-adjustable toothed cutting-plates assembled to move as a unit) which is so arranged and operated that, when the moving unit is at rest, its teeth register with the teeth, or certain of the teeth, of the stationary comb and enable the grippers to operate within the tooth spaces for seizing and withdrawing the tuft-lengths of yarn through the said tooth-spaces, after which lateral displacement of the moving cutter-comb through only a short distance, such as the distance but slightly exceeding the pitch-distance of its teeth, will simultaneously sever or cut-off the withdrawn tuft-lengths. This short-stroke tuft-cutting motion, which simultaneously cuts off the whole of the gripper-extracted tufts, may be followed by an idle return stroke of equally short length for bringing the moving teeth again into register with the fixed teeth, the whole cutting and return operations occupying only a fraction of the time required by the long-stroke successive-cutting mechanism hitherto used.

Or as an alternative arrangement, the mechanism may be adapted to cut on both strokes in which case, the operating gear is adapted, after having displaced the moving cutting comb through a cutting stroke in one direction, to bring the said moving comb to rest with its teeth in register with the teeth of the stationary knife-comb, and to maintain the two combs in such tooth-registration whilst the grippers are picking up and withdrawing a fresh series of tuft-lengths, after which the operating gear displaces the moving comb in the reverse direction for cutting-off the last-withdrawn series of tufts. In both systems, the moving comb may be displaced in one direction by cam or like mechanism acting on the comb-carriage and returned in the other direction by springs or weights, or both movements may be imparted positively by cam or other gearing.

The accompanying drawings show, by way of example, a tuft-cutting mechanism embodying an application of the present invention in which the moving cutting comb is made up or comprises a series or gang of separate, detachable and independently-adjustable cutting-plates assembled into a unit.

In the drawings,

Figure 1 is a general arrangement view, showing one complete cutter-plate and parts of two other plates assembled in their working relation to the fixed comb-plate of the loom. In this view, the cutter plates are shown with their teeth in register with teeth of the comb plate to enable (whilst the moving unit is stationary) extraction of the tufts through spaces between certain of the registering teeth by the tuft grippers.

Figure 2 is a vertical section of Figure 1 taken through one of the cutter-blade elements.

Figure 3 is a horizontal section taken on the dotted line 3—3, Figure 1.

The same letters of reference indicate corresponding parts in the several figures.

The illustrated application of the invention is adapted for embodiment in a Brinton-type loom for weaving Axminster carpets and the tuft-cutting mechanism is arranged in the loom in substantially the same relation to the tuft-extracting and planting grippers as in the existing type of loom and the parts constituting the moving cutting-comb assembly are slidably mounted upon, and guided in their reciprocations by attachments on, a guide-block $a$ of suitable and substantial section, which is suitably mounted across the frame of the loom and to the back of which the fixed knife-comb $b$ is secured in such a manner as to locate the same above and immediately behind the gripper mechanism. The lower edge of this fixed knife-comb is formed with a row of tuft-cutting teeth $b^1$ which are suitably pitched and located in relation to the grippers so that certain of the inter-tooth spaces register with the grippers and with the yarn carriers in the block that is mounted behind the knife-comb. The guide-block supports a frame or slide $c$ which is displaceable by cam and return-spring or like mechanism to and fro across the width of the loom, and serves to transmit corresponding reciprocations to a system of cutter-plates or cutting-comb elements $d$ which are slidably housed in an aligned row on the front of the stationary knife-comb immediately below the operating slide $c$. This slide may be constituted by a pair of end-members or boxes $c^1$ $c^2$ of substantial dimensions that slidably engage the transverse guide-block and are coupled by an assembly of tie-rods or bars $c^3$ $c^4$, the lowest of which ($c^4$) constitutes a knife-operating bar from which depend a series of knife-driving tongues or keys $c^5$ each engaging a recess or keyway $d^1$ in a complementary cutter-comb element.

These cutter-comb elements are of short length in relation to the stationary knife-comb; for example, a mechanism such as shown may embody a gang or row of twelve such elements in alignment, each having teeth $d^2$ along its lower edge, which teeth may be pitched to correspond with the pitching of the knife-comb teeth. Each cutter-comb is removably housed or located with its teeth in proper relationship to the complementary set of teeth on the fixed knife-comb by a keeper-plate $e$ which is carried by a pair of screw-studs $e^1$ projecting from the front of the knife-comb and is provided, at its upper edge, with a pair of laterally-separated and inturned lugs $e^2$ $e^3$ that bear directly upon the face of the fixed knife-comb (see Figure 2) and between which the corresponding driving key depends from the knife-operating bar into engagement with the cutter-comb, whilst the lower edge of the keeper-plate is inturned or flanged at $e^4$ to engage, in a plane substantially below the carrier-studs, a horizontal groove or recess $d^4$ formed across the front face of the cutter-comb immediately above the toothed edge of the latter. Each keeper plate is maintained in bearing contact with the stationary knife-comb and with its complementary moving cutter-comb by screw-nuts which are adjustable on the studs $e^1$ that carry the said keeper-plate; this arrangement not only accurately locating and guiding each of the gang of moving cutter-combs in relation to the fixed knife-comb, but also enabling independent adjustment of the said moving units into effective cutting relationship to the fixed unit and of easy and separate removal of any cutter-comb of the gang for sharpening or replacement purposes.

Spring washers $f$ may, if desired, be interposed between the front of each keeper-plate and the adjusting nuts on the plate-carrier studs to facilitate cut-regulation of the pressure transmitted from the said nuts to the moving cutter-combs through the flanged lower edges of the keeper-plates that engage the grooves in the fronts of the combs. Such cut-regulation or adjustment of the teeth of the moving combs in relation to the fixed comb teeth may be facilitated by reducing the section of the metal or forming a groove $g$ of substantial depth across that portion of the face of the stationary knife-comb against which the moving combs are held by the pressure transmitted thereto by the nut-adjusted keeper-plates.

Having described my invention, what I claim and desire to secure by Letters Patent is:—

1. A tuft-cutting mechanism for tufted fabric looms comprising in combination a stationary knife-comb, a moving cutter-comb made up of a gang of interchangeable toothed cutter-plates, a common operating bar with which said cutter-plates are detachably interconnected and which cutter-plates are independently adjustable in relation to said bar and a fixed guide bar upon which the operating bar of the moving cutter-comb assembly is slidably mounted and to which the stationary comb-plate is attached.

2. A tuft-cutting mechanism comprising in combination a stationary knife-comb, a moving cutter-comb made up of a gang of interchangeable toothed cutter-plates, a common operating bar with which said cutter-plates are detachably interconnected and which cutter-plates are independently adjustable in relation to said operating bar, a fixed guide bar upon which the moving cutter-comb assembly is slidably mounted and to which guide bar the stationary comb-plate is attached and a system of driving tongues associated with said operating bar, each of which tongues has driving connection with one of the moving plates of the gang.

3. A tuft-cutting mechanism for tufted fabric looms comprising in combination a stationary knife-comb, a moving cutter-comb made up of a gang of interchangeable toothed cutter-plates, a common operating bar with which said cutter-plates are detachably interconnected and which cutter-plates are independently adjustable in relation to said bar, a fixed guide bar upon which the operating bar of the moving cutter-comb assembly is slidably mounted and to which the stationary comb-plate is attached, and a series of keeper-plates which are detachably connected with said comb-plate and serve to locate each of said cutting-plates in relation to the stationary comb-plate and guide each of such plates in its working strokes.

4. A tuft-cutting mechanism comprising in combination a stationary knife-comb, a moving cutter-comb made up of a gang of interchangeable toothed cutter-plates, a common operating bar with which said cutter-plates are detachably interconnected and which cutter-plates are independently adjustable in relation to said operating bar, a fixed guide bar upon which the moving cutter-comb assembly is slidably mounted and to which guide bar the stationary comb-plate is attached, a system of driving tongues associated with said operating bar, each of which driving tongues has driving connection with one of the moving plates of the gang, and a series of keeper-plates which are detachably connected with said comb-plate, said keeper-plates serving to locate each of said cutting-plates in relation to the stationary comb-plate and to guide each of such plates in its working strokes.

5. A tuft-cutting mechanism according to claim 4 wherein each keeper-plate is made to contact, as by spring-applied pressure, with the comb-plate by a pair of laterally separated members between which a driving tongue of the cutting-plate operating bar extends into the driving connection with its complementary cutting-plate.

6. A tuft-cutting mechanism comprising in combination a stationary knife-comb, a moving cutter-comb made up of a gang of interchangeable toothed cutter-plates, a common operating bar with which said cutter-plates are detachably interconnected and with cutter-plates are independently adjustable in relation to said operating bar, a fixed guide bar upon which the moving cutter-comb assembly is slidably mounted and to which guide bar the stationary comb-plate is attached, a system of driving tongues associated with said operating bar, each of which driving tongues has driving connection with one of the moving plates of the gang, and a series of keeper-plates which are detachably connected with said comb-plate and which serve to locate each of the said cutting-plates in relation to the stationary comb-plate and to guide each of such plates in its working strokes, said keeper-plates being arranged to engage their respective cutting-plates adjacent to the toothed edges of the latter.

7. A tuft-cutting mechanism according to claim 4 wherein each keeper-plate is made to contact, as by spring-applied pressure, with the comb-plate by a pair of laterally separated members between which a driving tongue of the cutting-plate operating bar extends into the driving connection with its complementary cutting-plate, said keeper-plates being arranged to engage their respective cutting-plates adjacent to the toothed edges of the latter.

In witness whereof I affix my signature.

CECIL C. BRINTON.